United States Patent
Amagasa (10) Patent No.: US 10,086,798 B2
(45) Date of Patent: Oct. 2, 2018

(54) WIPER SYSTEM CONTROL METHOD AND WIPER SYSTEM

(71) Applicant: MITSUBA Corporation, Gunma (JP)

(72) Inventor: Toshiyuki Amagasa, Gunma (JP)

(73) Assignee: MITSUBA CORPORATION, Gunma (JP)

( * ) Notice: Subject to any disclaimer, the term of this patent is extended or adjusted under 35 U.S.C. 154(b) by 4 days.

(21) Appl. No.: 15/127,130

(22) PCT Filed: Mar. 21, 2015

(86) PCT No.: PCT/JP2015/058634
§ 371 (c)(1),
(2) Date: Sep. 19, 2016

(87) PCT Pub. No.: WO2015/146867
PCT Pub. Date: Oct. 1, 2015

(65) Prior Publication Data
US 2017/0106837 A1    Apr. 20, 2017

(30) Foreign Application Priority Data

Mar. 27, 2014    (JP) .................. 2014-066254

(51) Int. Cl.
*B60S 1/04*    (2006.01)
*B60S 1/34*    (2006.01)
*B60S 1/08*    (2006.01)

(52) U.S. Cl.
CPC .............. *B60S 1/0469* (2013.01); *B60S 1/08* (2013.01); *B60S 1/3486* (2013.01); *B60S 1/3495* (2013.01)

(58) Field of Classification Search
CPC ......... B60S 1/0469; B60S 1/08; B60S 1/3486
(Continued)

(56) References Cited

U.S. PATENT DOCUMENTS

| | | | |
|---|---|---|---|
| 2007/0273313 A1* | 11/2007 | Ikeda | B60S 1/08 318/282 |
| 2008/0136361 A1* | 6/2008 | Yoshigoe | B60S 1/0818 318/483 |
| 2013/0340193 A1* | 12/2013 | Iizuka | B60S 1/0427 15/250.13 |

FOREIGN PATENT DOCUMENTS

| | | |
|---|---|---|
| EP | 0 806 330 | 11/1997 |
| FR | 2 757 815 | 7/1998 |

(Continued)

OTHER PUBLICATIONS

Extended European Search Report dated Oct. 20, 2017 in European Application No. 15767736.0.

(Continued)

*Primary Examiner* — Muhammad Shafi
(74) *Attorney, Agent, or Firm* — Wenderoth, Lind & Ponack, L.L.P.

(57) ABSTRACT

A wiper system 1 has a wiper blade 5 for performing a reciprocating wiping operation on a windshield glass 6 and a brushless motor 2 for causing the wiper blade 5 to perform the reciprocating wiping operation. The motor used as the brushless motor 2 is provided with a rotary shaft for reciprocating the wiper blade 5, has a degree of operation freedom in three axial directions, and is rotatable about axes of two directions orthogonal to the rotary shaft. The wiper blade 5 operates at error angles θ different in direction between during a forward-path wiping operation and during a return-path wiping operation. When the wiper blade 5 reaches a reversing position, the brushless motor 2 is made to rotate about an axis extending in a extending direction of the wiper blade 5 to change the error angle θ.

4 Claims, 4 Drawing Sheets

(58) Field of Classification Search
USPC .......................................................... 701/49
See application file for complete search history.

(56) References Cited

FOREIGN PATENT DOCUMENTS

| | | |
|---|---|---|
| JP | 62-116341 | 5/1987 |
| JP | 3-75063 | 7/1991 |
| JP | 5-15685 | 2/1993 |
| JP | 5-124488 | 5/1993 |
| JP | 5-56699 | 7/1993 |
| JP | 7-186890 | 7/1995 |
| JP | 7-186892 | 7/1995 |

OTHER PUBLICATIONS

International Search Report dated Apr. 28, 2015 in International (PCT) Application No. PCT/JP2015/058634.
International Preliminary Report on Patentability and Written Opinion of the International Searching Authority dated Oct. 6, 2016 in corresponding International (PCT) Application No. PCT/JP2015/058634.

\* cited by examiner

WIPER SYSTEM CONTROL METHOD AND WIPER SYSTEM

TECHNICAL FIELD

The present invention relates to a wiper system mounted on a vehicle such as an automobile and, more particularly, to a technology for optimizing the operating attitude of a wiper blade during wiping of a windshield.

BACKGROUND ART

As a characteristic value governing wiping performance of a wiper device, an error angle indicating an angle between a wiper blade (hereinafter, abbreviated as "blade" as needed) and a windshield. In general, the error angle is set to an angle slightly shifted in such a direction that the blade is dragged from 0 (right angle between a wiping surface and blade) at an intermediate position between blade upper and lower reversing positions. In this case, an inclining direction of the blade in a wiper operation forward path and that of the blade in a wiper operation return path are opposite to each other (error angle setting directions are opposite to each other). It follows that the inclining direction of the blade is reversed after reversal operation, and thereafter the wiping operation is performed in such a way that the blade is dragged.

CITATION LIST

Patent Document

Patent Document 1: Japanese UM Application Publication No. 3-75063
Patent Document 2: Japanese UM Application Publication No. 5-56699
Patent Document 3: Jpn. Pat. Appln. Laid-Open Publication No. 5-124488
Patent Document 4: Japanese UM Application Publication No. 5-15685

DISCLOSURE OF THE INVENTION

Problems to be Solved by the Invention

In a conventional wiper system, a wiper arm swings about a single-axis pivot shaft, and the error angle is set based on a mechanical structure as disclosed in Patent Documents 1 and 2. Thus, the blade cannot be operated at an optimum inclination suitable for a windshield surface, which may result in wiping unevenness depending on conditions. On the other hand, in Patent Document 3, a mechanism for changing the error angle in accordance with the wiper arm operation is provided to allow the error angle to be set according to a blade position. However, a wiper system provided with such a mechanism becomes complicated in structure, resulting in an increase in the number of causes of trouble and increase in device weight and cost.

Means for Solving the Problems

A wiper system control method according to the present invention is a method of controlling the wiper system including a wiper blade for performing a reciprocating wiping operation on a wiping surface and an electric motor for causing the wiper blade to perform the reciprocating wiping operation. The wiper blade operates at error angles different in direction between during a forward-path wiping operation and during a return-path wiping operation. When the wiper blade reaches a reversing position, the error angle is changed.

In the present invention, an inclining direction of the wiper blade is changed immediately at the upper and lower reversing positions, and even after the operation direction is reversed, the wiping operation is performed in an attitude suitable for a wiping direction from the start. As a result, it is possible to suppress occurrence of a wiping defect such as wiping unevenness more surely than when the blade inclination is changed in the middle of the wiping operation after the reversal.

In the above wiper system control method, the electric motor may be a motor provided with a rotary shaft for reciprocating the wiper blade, having a degree of operation freedom in three axial directions, and rotatable about axes of two directions orthogonal to the rotary shaft, and when the wiper blade reaches the reversing position, the motor may be made to rotate about one of the two axes about which the motor can rotate that extends in an extending direction of the wiper blade to change the error angle in an opposite direction.

Further, the wiper system may have a pivot shaft connected to the rotary shaft of the electric motor and a wiper arm fixed to the pivot shaft and attached with the wiper blade, the wiper arm may have a base disposed at the pivot shaft side and operating together with the pivot and a leading portion having a rotary support shaft, rotatably attached to the base by the rotary support shaft, and attached with the wiper blade, the base may have a motor that causes the rotary support shaft to rotate, and when the wiper blade reaches the reversing position, the motor may be made to rotate to change the error angle in an opposite direction.

Further, the wiper system may have a pivot shaft connected to the rotary shaft of the electric motor through a joint member and a wiper arm attached to the pivot shaft and attached with the wiper blade, the joint member may have a pivot part connected with the pivot shaft, a first joint mounted to the pivot part and configured to be swingable about a first axis orthogonal to the pivot shaft and extending in an extending direction of the wiper blade and a second joint mounted to the first joint and configured to be swingable about a second axis orthogonal to the pivot shaft and the first axis, the first joint may be swingably mounted to the pivot part by a first support shaft fixed to the first joint and disposed along the first axis, and second joint may be swingably mounted to the first joint by a second support shaft fixed to the second joint and disposed along the second axis, a first motor for rotating the first support shaft may be housed in the first joint, and a second motor for rotating the second support shaft may be housed in the second joint, and when the wiper blade reaches the reversing position, the first motor may be made to rotate to rotate the joint member about the first axis to change the error angle in an opposite direction.

A wiper system according to the present invention includes a wiper blade for performing a reciprocating wiping operation on a wiping surface and an electric motor for causing the wiper blade to perform the reciprocating wiping operation. The wiper system includes a controller that makes the wiper blade operate at error angles different in direction between during a forward-path wiping operation and during a return-path wiping operation and changes the error angle when the wiper blade reaches a reversing position.

In the present invention, an inclining direction of the wiper blade is changed immediately at the upper and lower reversing positions by the controller, and even after the operation direction of the wiper blade is reversed, the wiping operation is performed in an attitude suitable for a wiping direction from the start. As a result, it is possible to suppress occurrence of a wiping defect such as wiping unevenness more surely than when the blade inclination is changed in the middle of the wiping operation after the reversal.

In the above wiper system, the electric motor may be a motor provided with a rotary shaft for reciprocating the wiper blade, having a degree of operation freedom in three axial directions, and rotatable about axes of two directions orthogonal to the rotary shaft, and the controller may rotate the motor about one of the two axes about which the motor can rotate that extends in an extending direction of the wiper blade when the wiper blade reaches the reversing position to change the error angle in an opposite direction.

Further, the wiper system may have a pivot shaft connected to the rotary shaft of the electric motor and a wiper arm fixed to the pivot shaft and attached with the wiper blade, the wiper arm may have a base disposed at the pivot shaft side and operating together with the pivot and a leading portion having a rotary support shaft, rotatably attached to the base by the rotary support shaft, and attached with the wiper blade, the base may have a motor that causes the rotary support shaft to rotate, and the controller may rotate the motor when the wiper blade reaches the reversing position to change the error angle in an opposite direction.

Further, the wiper system may have a pivot shaft connected to the rotary shaft of the electric motor through a joint member and a wiper arm attached to the pivot shaft and attached with the wiper blade, the joint member may have a pivot part connected with the pivot shaft, a first joint mounted to the pivot part and configured to be swingable about a first axis orthogonal to the pivot shaft and extending in an extending direction of the wiper blade, and a second joint mounted to the first joint and configured to be swingable about a second axis orthogonal to the pivot shaft and first axis, the first joint may be swingably mounted to the pivot part by a first support shaft fixed to the first joint and disposed along the first axis, and the second joint may be swingably mounted to the first joint by a second support shaft fixed to the second joint and disposed along the second axis, a first motor for rotating the first support shaft may be housed in the first joint, and a second motor for rotating the second support shaft may be housed in the second joint, and the controller may rotate the first motor when the wiper blade reaches the reversing position to rotate the joint member about the first axis to change the error angle in an opposite direction.

Advantages of the Invention

According to the wiper system control method of the present invention, the wiper blade is made to operate at error angles different in direction between during a forward-path wiping operation and during a return-path wiping operation, and when the wiper blade reaches a reversing position, the error angle is changed. With this configuration, an inclining direction of the wiper blade is changed immediately at the upper and lower reversing positions. As a result, even after the operation direction of the wiper blade is reversed, the wiping operation is performed in an attitude suitable for a wiping direction from the start. Thus, it is possible to suppress occurrence of a wiping defect such as wiping unevenness more surely than when the blade inclination is changed in the middle of the wiping operation after the reversal. Further, it is possible to control the error angle without a complicated mechanism. This can prevent increases in the number of causes of trouble and in the weight of the device and can also realize a compact system, improving layout performance.

According to the wiper system of the present invention, there is provided a controller that makes the wiper blade operate at error angles different in direction between during a forward-path wiping operation and during a return-path wiping operation and changes the error angle when the wiper blade reaches a reversing position. With this configuration, an inclining direction of the wiper blade is changed immediately at the upper and lower reversing positions. As a result, even after the operation direction of the wiper blade is reversed, the wiping operation is performed in an attitude suitable for a wiping direction from the start. Thus, it is possible to suppress occurrence of a wiping defect such as wiping unevenness more surely than when the blade inclination is changed in the middle of the wiping operation after the reversal. Further, it is possible to control the error angle without a complicated mechanism. This can prevent increases in the number of causes of trouble and in the weight of the device and can also realize a compact system, improving layout performance.

BEST MODE FOR CARRYING OUT THE INVENTION

The object of the following embodiments is to optimize an operating attitude of a wiper blade during a wiping operation without adding a complicated mechanism to realize a stable wiping operation.

First Embodiment

Figure 1:
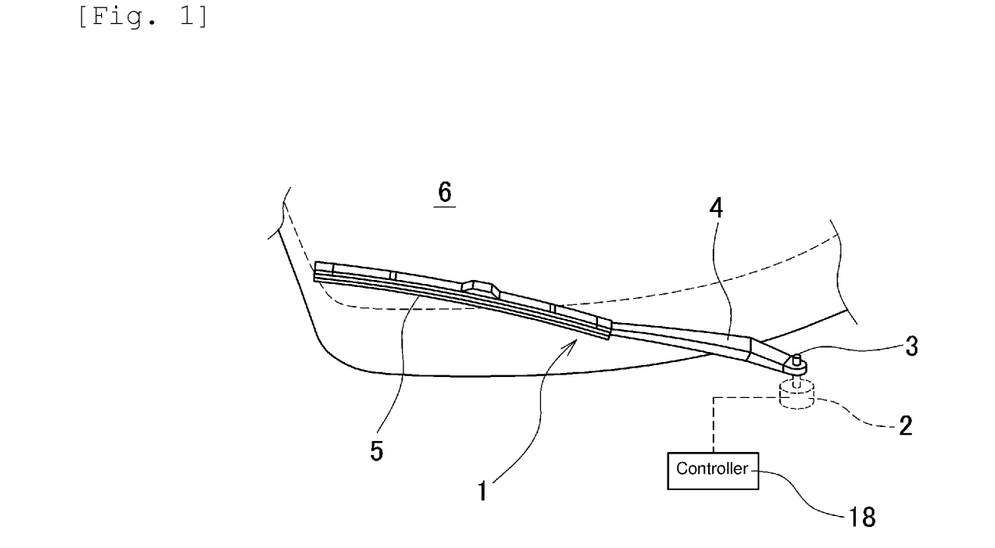
FIG. 1 is an explanatory view illustrating a configuration of a wiper system according to a first embodiment of the present invention.

Hereinafter, embodiments of the present invention will be described in detail with reference to the drawings. FIG. 1 is an explanatory view illustrating a configuration of a wiper system 1 according to a first embodiment of the present invention. As illustrated in FIG. 1, the wiper system 1 includes, as a drive source, a brushless motor 2 (electric motor, hereinafter, abbreviated as "motor 2") having a degree of freedom in three axial directions. The wiper system 1 further includes a pivot shaft 3 connected to a rotary shaft of the motor 2, a wiper arm 4 fixed to the pivot shaft 3, and a wiper blade 5 detachably attached to the wiper arm 4. The wiper blade 5 is disposed on a windshield glass 6 (hereinafter, abbreviated as "glass 6") of a vehicle. The wiper blade 5 is brought into contact with the glass 6 while being pressed by an unillustrated spring mounted in the wiper arm 4. The wiper arm 4 swings up and down by normal and reverse rotations of the pivot shaft 3. As the wiper arm 4 swings, the wiper blade 5 also swings and performs wiping operation between upper and lower reversing positions set on the glass 6.

Figure 2:
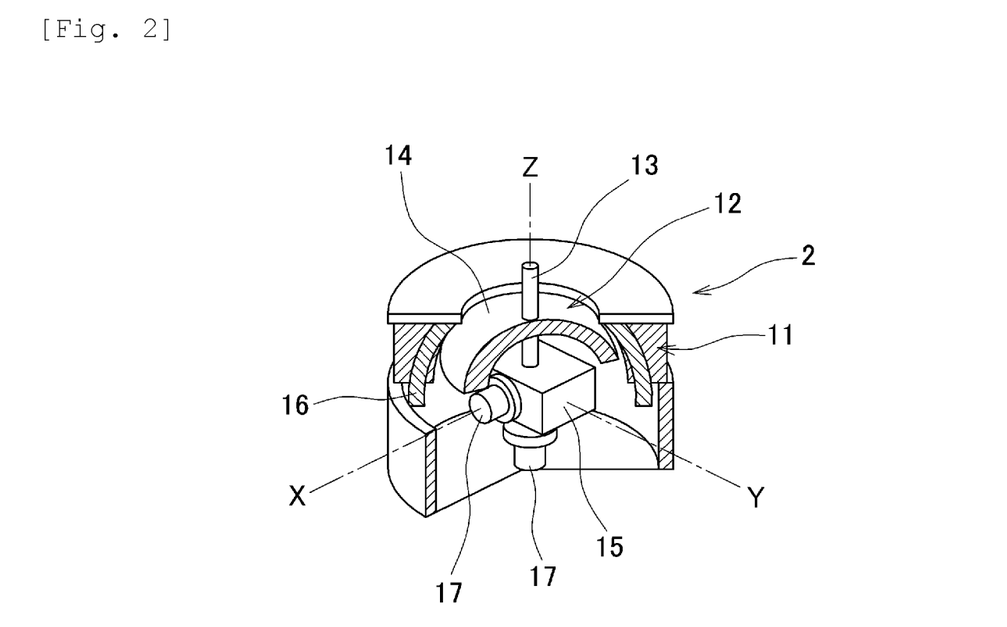
FIG. 2 is an explanatory view illustrating a configuration of a motor used in the wiper system of FIG. 1.

In the wiper system 1, the three degree-of-freedom motor is used as a drive source of the wiper arm to perform a wiping operation while constantly inclining the blade in a travel direction to thereby stabilize the wiping operation. FIG. 2 is an explanatory view illustrating a configuration of the motor 2 ("Multidimensional actuator" from "SICE (Society of Instrument and Control Engineers Public Interest Incorporated Association) Online Handbook"). The motor 2 is a multidimensional actuator constituted of a spherical stator 11 and a semispherical rotor 12. The rotor 12 has a rotary shaft 13 and a semispherical rotor core 14 fixed to the rotary shaft 13. The rotary shaft 13 is freely-rotatably supported by a bearing 15 and connected to the pivot shaft 3.

Three coil pairs 16 are arranged in the stator 11. By appropriately controlling an exciting current of each coil 16, it is possible to rotate (Z-axis) or swing (X- and Y-axes) the rotor 12 about X-, Y-, and Z-axes. The X- and Y-axes are axes extending in two directions orthogonal to the rotary shaft 13, respectively. The motor 2 is a motor (actuator) having a degree of operation freedom in three axial directions and rotatable about the X- and Y-axes. A rotation of the motor 2 about the X-axis causes the wiper blade 5 to rotate about an axis along an extending direction thereof. A rotation of the motor 2 about the Y-axis causes the wiper blade 5 to swing in an up-down direction (vertical direction with respect to the glass 6). A current to be supplied to each coil 16 is controlled by a controller 18 based on a detection value of a rotating angle sensor 17.

Figure 3:
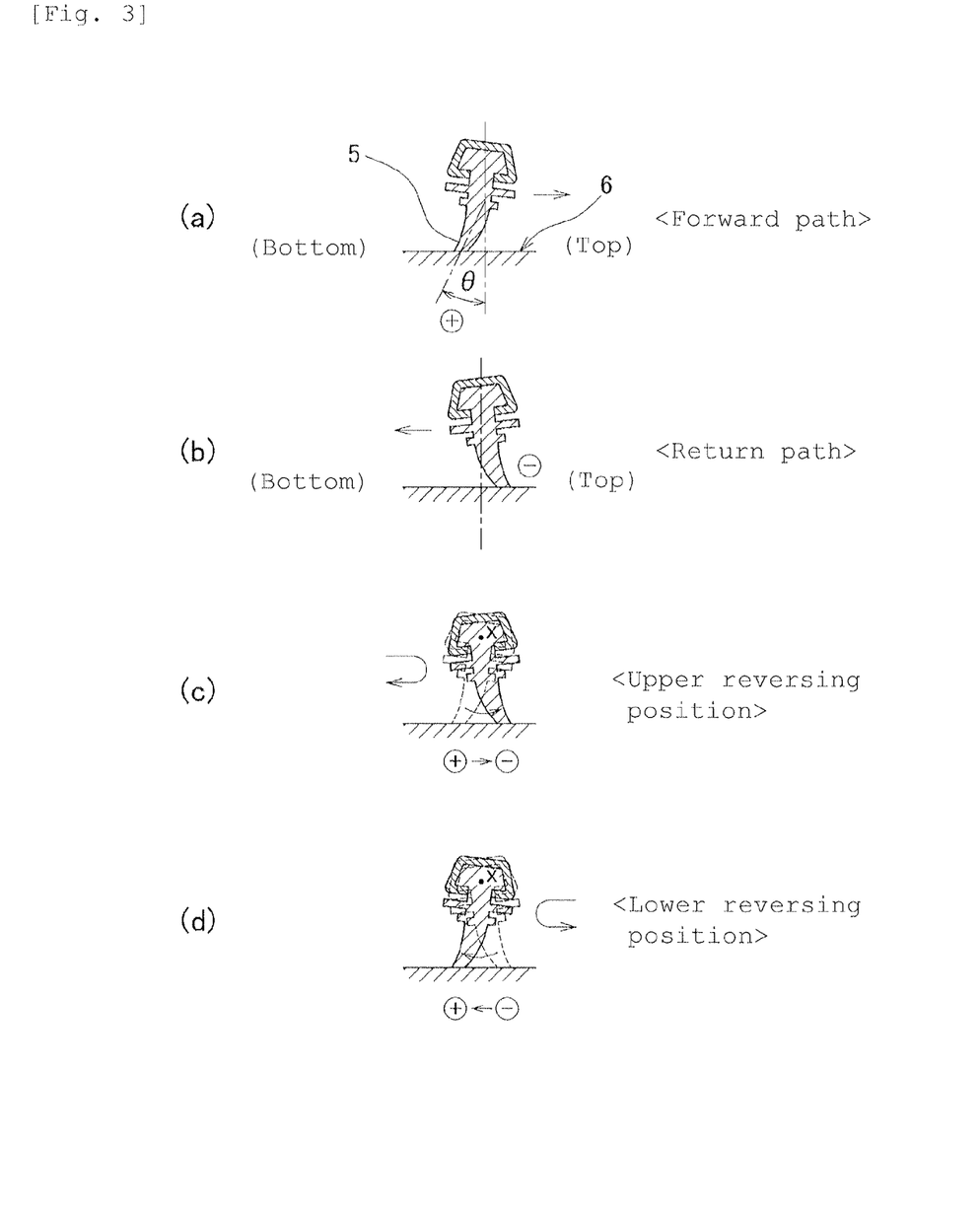
FIG. 3A to 3D are explanatory views each illustrating a blade operation in the wiper system of FIG. 1.

FIG. 3A to 3D are explanatory views each illustrating a blade operation in the wiper system 1 of FIG. 1 as viewed from a leading end side thereof. As illustrated in FIG. 3A to 3D, in the wiper system 1, the wiper blade 5 operates with an upper side thereof inclined in the travel direction at a position between the upper and lower reversing positions. An error angle θ of the wiper blade 5 is maintained by the inclination in the travel direction between the upper and lower reversing positions but is reversed between a forward path (bottom→top: FIG. 3A) and a return path (top→bottom: FIG. 3B). Here, the error angle θ in the forward path is defined as "+ direction" and that in the return path is "− direction". In the wiper system 1, the rotation of the motor 2 about the X- and Y-axes is appropriately controlled by the controller 18 depending on a change in a curved surface of the glass 6, a wiping speed, or a travel speed. The controller 18 controls an arm pressing force and attitude (error angle or depression angle) of the wiper blade in an optimum condition.

When the wiper blade 5 reaches the upper and lower reversing positions, the motor 2 is made to rotate at that moment about the X-axis (vertical direction with respect to the paper surface of FIG. 3A to 3D) to change the inclining direction of the wiper blade 5. As a result, the error angle θ shifts from the "+ direction" to "− direction" at the upper reversing position (FIG. 3C) and from the "− direction" to "+ direction" at the lower reversing position (FIG. 3D). That is, the inclining direction (error angle) of the wiper blade is changed immediately to the opposite direction at the upper and lower reversing positions. Thus, even after the operation direction is reversed, the wiping operation is performed in an attitude suitable for the wiping direction from the start, thereby suppressing occurrence of a wiping defect such as wiping unevenness more surely than when the blade incli- nation is changed in the middle of the wiping operation after the reversal. Further, it is possible to control the error angle without a complicated mechanism. This can prevent increases in the number of causes of trouble and in the weight of the device and can also realize a compact system, improving layout performance.

Second Embodiment

Figure 4:
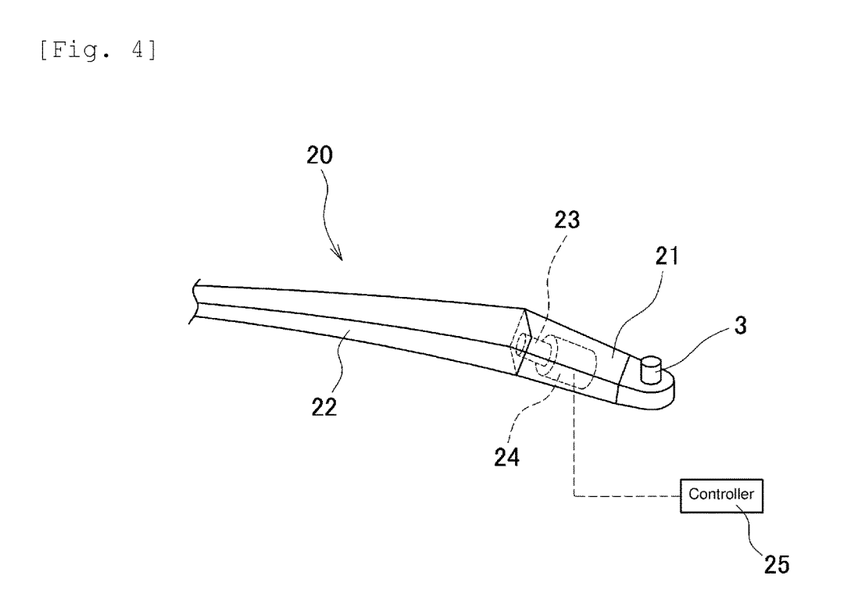
FIG. 4 is an explanatory view illustrating a configuration of a main part of a wiper system according to a second embodiment of the present invention.

FIG. 4 is an explanatory view illustrating a configuration of a main part of a wiper system 20 according to a second embodiment of the present invention. In the description of the following embodiments, the same reference numerals are given to the same components and portions as in the first embodiment and descriptions thereof will be omitted. As illustrated in FIG. 4, in the second embodiment, the wiper arm 4 is separated into a base 21 and a leading end portion 22. The base 21 is fixed to the pivot shaft 3. The leading end portion 22 is attached with the wiper blade 5. A rotary support shaft 23 is provided at the base 21 side of the leading end portion 22. The rotary support shaft 23 is connected to a rotary shaft of a motor 24 disposed in the base 21 side. When the motor 24 is actuated, the leading end portion 22 rotates together with the rotary support shaft 23. As the motor 24 rotates, the wiper blade 5 swings. The motor 24 is controlled by a controller 25.

In the wiper system 20, the motor 24 is actuated when the wiper blade 5 reaches the upper and lower reversing positions to change the inclining direction of the wiper blade 5. As a result, the error angle θ is reversed at the upper and lower reversing positions. Thus, as described above, even after the operation direction is reversed, the wiping operation is performed in an attitude suitable for the wiping direction from the start, thereby suppressing occurrence of a wiping defect such as wiping unevenness. Further, it is possible to control the error angle without a complicated mechanism. This can prevent increases in the number of causes of trouble and in the weight of the device and can also realize a compact system, improving layout performance.

Third Embodiment

Figure 5:
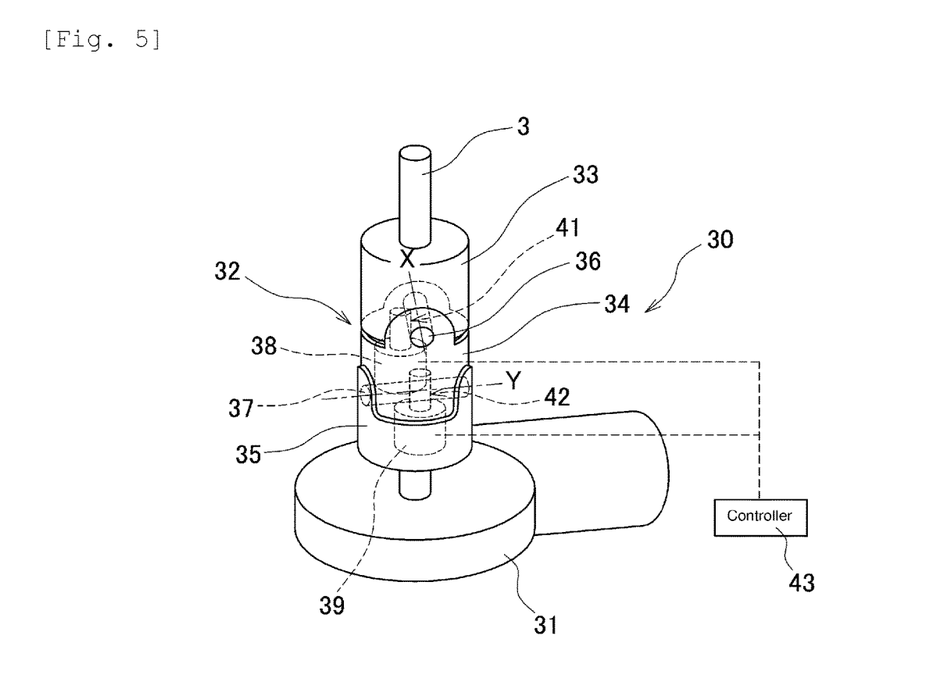
FIG. 5 is an explanatory view illustrating a configuration of a joint used in a wiper system according to a third embodiment of the present invention.

FIG. 5 is an explanatory view illustrating a configuration of a wiper system 30 according to a third embodiment of the present invention. As illustrated in FIG. 5, in the present embodiment, a joint (joint member) 32 is provided between a wiper motor 31 and the pivot shaft 3. The joint 32 has a pivot part 33 connected with the pivot shaft 3, a first joint 34 mounted to the pivot part 33 and configured to be swingable about an X-axis (first axis), and a second joint 35 mounted to the first joint 34 and configured to be swingable about a Y-axis (second axis). The first joint 34 is swingably mounted to the pivot part 33 by a support shaft (first support shaft) 36. The second joint 35 is swingably mounted to the first joint 34 by a support shaft 37 (second support shaft). The support shaft 36 and support shaft 37 are fixed, respectively, to the pivot part 33 and the first joint 34.

A motor 38 (first motor) for rotating the support shaft 36 is housed in the first joint 34. A motor 39 (second motor) for rotating the support shaft 37 is housed in the second joint 35. Rotational energy of the motor 38 is transmitted to the support shaft 36 by a deceleration mechanism 41. Rotational energy of the motor 39 is transmitted to the support shaft 37 by a deceleration mechanism 42. When the motor 38 is actuated, the pivot part 33 rotates together with the support shaft 36. When the motor 39 is actuated, the first joint 34 rotates together with the support shaft 37. As a result, the wiper blade 5 starts swinging. The motors 38 and 39 are controlled by a controller 43.

In the wiper system 30, the motor 38 is actuated when the wiper blade 5 reaches the upper and lower reversing positions. When the motor 38 is actuated, the joint 32 rotates about the X-axis to change the inclining direction of the wiper blade 5. As a result, the error angle θ is reversed at the upper and lower reversing positions. Thus, as described above, even after the operation direction is reversed, the wiping operation is performed in an attitude suitable for the wiping direction from the start, thereby suppressing occurrence of a wiping defect such as wiping unevenness. Further, it is possible to control the error angle without a complicated mechanism. This can prevent increases in the number of causes of trouble and in the weight of the device and can also realize a compact system, improving layout performance. Also in the wiper system 30, the motors 38 and 39 are appropriately controlled according to a change in a curved surface of the glass 6 to thereby allow control of the attitude of the wiper blade 5 in an optimum condition.

The present invention is not limited to the embodiments as described above and may be variously modified without departing from the scope of the invention.

For example, in the above embodiments, a brushless motor (actuator) having a degree of freedom in three axial directions is used to change the inclining direction of the wiper blade 5; however, as the drive source for the wiper blade 5, a three-degrees-of-freedom spherical piezoelectric motor can be used in addition to the motor of FIG. 1.

Figure 6:
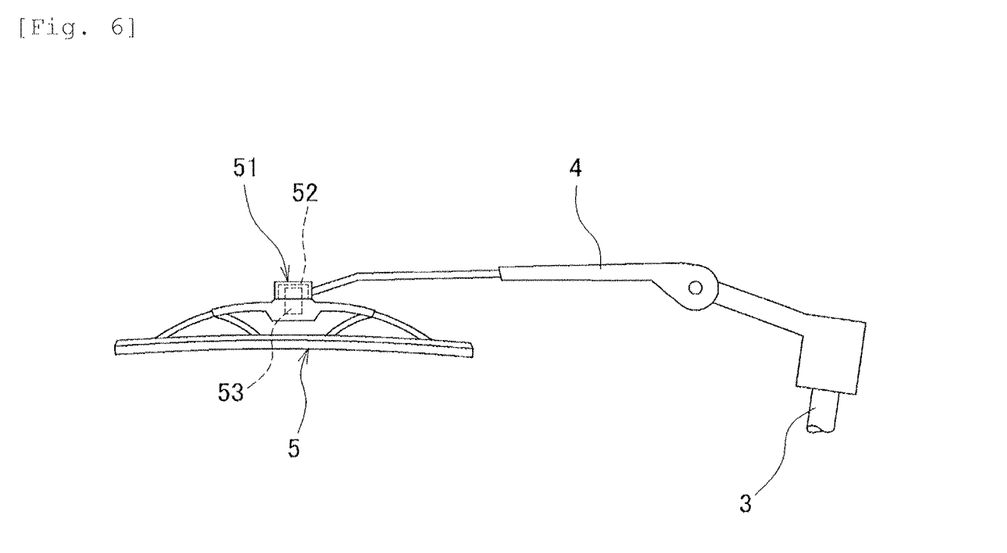
FIG. 6 is an explanatory view illustrating another example of a mechanism for changing an error angle of a wiper blade.

Further, as a mechanism that moves the wiper blade 5 left and right to change the error angle when the wiper blade 5 reaches the reversing position, an operating means like an actuator 51 may be provided at a connection portion between the wiper blade 5 and the wiper arm 4 (see FIG. 6). In this case, the wiper blade 5 is swingably attached to the wiper arm 4 at the connection portion. The actuator 51 is constituted of a drive part 52 disposed at the wiper arm 4 side and a swing piece 53 mounted to the wiper blade 5 side. The swing piece 53 is actuated by the drive part 52 to change the error angle of the wiper blade 5.

INDUSTRIAL APPLICABILITY

In the wiper system of the embodiments described above, the present invention is applied to a parallel-wiping type wiper device in which two wiper blades operate in parallel; however, the present invention may be applied to an opposing-wiping type wiper device in which two wiper blades operate in opposite directions.

REFERENCE SIGNS LIST

1: Wiper system
2: Brushless motor
3: Pivot shaft
4: Wiper arm
5: Wiper blade
6: Windshield glass
11: Stator
12: Rotor
13: Rotary shaft
14: Rotor core
15: Bearing
16: Coil
17: Rotating angle sensor
20: Wiper system
21: Base
22: Leading end portion
23: Rotary support shaft
24: Motor
30: Wiper system
31: Wiper motor
32: Joint
33: Pivot part
34: First joint
35: Second joint
36: Support shaft (first support shaft)
37: Support shaft (second support shaft)
38: Motor (first motor)
39: Motor (second motor)
41: Deceleration mechanism
42: Deceleration mechanism
51: Actuator
52: Drive part
53: Swing piece
θ: Error angle

The invention claimed is:

1. A wiper system including:
a wiper blade configured to perform a reciprocating wiping operation on a wiping surface;
an electric motor configured to cause the wiper blade to perform the reciprocating wiping operation; and
a controller configured to cause the wiper blade to operate at error angles different in direction between during a forward-path wiping operation and during a return-path wiping operation and to change the error angle when the wiper blade reaches a reversing position.

2. The wiper system according to claim 1, wherein
the electric motor includes a rotary shaft configured to reciprocate the wiper blade, has a degree of operation freedom in three axial directions, and is rotatable about axes of two directions orthogonal to the rotary shaft, and
the controller is configured to rotate the motor about one of the two axes about which the motor can rotate that extends in an extending direction of the wiper blade when the wiper blade reaches the reversing position to change the error angle in an opposite direction.

3. The wiper system according to claim 1, wherein
the wiper system has a pivot shaft connected to the rotary shaft of the electric motor and a wiper arm fixed to the pivot shaft and attached with the wiper blade,
the wiper arm has a base disposed at the pivot shaft side and operating together with the pivot shaft and a leading portion having a rotary support shaft, rotatably attached to the base by the rotary support shaft, and attached with the wiper blade,
the base has a motor that is configured to cause the rotary support shaft to rotate, and
the controller is configured to rotate the motor when the wiper blade reaches the reversing position to change the error angle in an opposite direction.

4. The wiper system according to claim 1, wherein
the wiper system has a pivot shaft connected to the rotary shaft of the electric motor through a joint member and a wiper arm attached to the pivot shaft and attached with the wiper blade,
the joint member has a pivot part connected with the pivot shaft, a first joint mounted to the pivot part and configured to be swingable about a first axis orthogonal to the pivot shaft and extending in an extending direction of the wiper blade and a second joint mounted to the first joint and configured to be swingable about a second axis orthogonal to the pivot shaft and the first axis, the first joint is swingably mounted to the pivot part by a first support shaft fixed to the first joint and disposed along the first axis, and the second joint is swingably mounted to the first joint by a second support shaft fixed to the second joint and disposed along the second axis, a first motor configured to rotate the first support shaft is housed in the first joint, and a second motor configured to rotate the second support shaft is housed in the second joint, and the controller is configured to rotate the first motor when the wiper blade reaches the reversing position to rotate the joint member about the first axis to change the error angle in an opposite direction.

* * * * *